(12) United States Patent
Mitsuo et al.

(10) Patent No.: US 9,758,126 B2
(45) Date of Patent: Sep. 12, 2017

(54) VEHICLE CHILD SAFETY SEAT AND SHOULDER PAD

(71) Applicants: Tetsu Mitsuo, Nissin (JP); Osamu Nakagawa, Hikone (JP); Masayuki Sakumoto, Higashiomi (JP)

(72) Inventors: Tetsu Mitsuo, Nissin (JP); Osamu Nakagawa, Hikone (JP); Masayuki Sakumoto, Higashiomi (JP)

(73) Assignees: TOYOTA JIDOSHA KABUSHIKI KAISHA, Toyota (JP); TAKATA CORPORATION, Tokyo (JP)

( * ) Notice: Subject to any disclaimer, the term of this patent is extended or adjusted under 35 U.S.C. 154(b) by 199 days.

(21) Appl. No.: 14/647,964

(22) PCT Filed: Nov. 27, 2013

(86) PCT No.: PCT/IB2013/002638
§ 371 (c)(1),
(2) Date: May 28, 2015

(87) PCT Pub. No.: WO2014/083405
PCT Pub. Date: Jun. 5, 2014

(65) Prior Publication Data
US 2015/0298647 A1    Oct. 22, 2015

(30) Foreign Application Priority Data
Nov. 29, 2012 (JP) .................................. 2012-261492

(51) Int. Cl.
*B60R 22/14* (2006.01)
*B60N 2/28* (2006.01)
(Continued)

(52) U.S. Cl.
CPC .............. *B60R 22/14* (2013.01); *B60N 2/265* (2013.01); *B60N 2/2812* (2013.01);
(Continued)

(58) Field of Classification Search
CPC ....... B60R 22/14; B60R 22/105; B60N 2/265; B60N 2/2812
(Continued)

(56) References Cited

U.S. PATENT DOCUMENTS 8,408,656 B2 * 4/2013 Carpenter ............. B60R 22/105
297/468
2001/0013719 A1 8/2001 Carine et al.
(Continued)

FOREIGN PATENT DOCUMENTS

EP   1338485 A2   8/2003
EP   1454805 A2   9/2004
(Continued)

*Primary Examiner* — Anthony D Barfield
(74) *Attorney, Agent, or Firm* — Oliff PLC

(57) ABSTRACT

A vehicle child safety seat includes: a seat main body on which an occupant sits; a seat belt for restraining the occupant to the seat main body, the seat belt including a shoulder harness having a long belt shape and facing a shoulder of the occupant; and a shoulder pad including a hold member formed of a material having a flexibility into an elongated shape and placed between the shoulder of the occupant and the shoulder harness along a longitudinal direction of the shoulder harness, attached to the shoulder harness slidably in the longitudinal direction, and including a plurality of hard members formed of a material harder than the hold member and provided side by side at intervals therebetween in a longitudinal direction of the hold member, the plurality of hard members being attached to a shoulder-harness-side surface of the hold member.

10 Claims, 12 Drawing Sheets

(51) Int. Cl.
*B60N 2/26* (2006.01)
*B60R 22/10* (2006.01)

(52) U.S. Cl.
CPC .... *B60R 22/105* (2013.01); *B60N 2002/2815* (2013.01); *B60N 2002/2818* (2013.01)

(58) Field of Classification Search
USPC .............................................. 297/484; 2/268
See application file for complete search history.

(56) References Cited

U.S. PATENT DOCUMENTS

| | | |
|---|---|---|
| 2003/0046750 A1 | 3/2003 | D'Addario et al. |
| 2003/0159258 A1 | 8/2003 | Wetter |
| 2010/0213696 A1 | 8/2010 | Kawata et al. |

FOREIGN PATENT DOCUMENTS

| | | |
|---|---|---|
| JP | 2001-287576 A | 10/2001 |
| JP | 2003-276559 A | 10/2003 |
| JP | 2004-075015 A | 3/2004 |
| JP | 2008-290587 A | 12/2008 |
| JP | 4796049 B2 | 10/2011 |
| JP | 2012-020687 A | 2/2012 |
| WO | 2005/092677 A1 | 10/2005 |

* cited by examiner

VEHICLE CHILD SAFETY SEAT AND SHOULDER PAD

BACKGROUND OF THE INVENTION

1. Field of the Invention

The invention relates to a vehicle child safety seat and a shoulder pad attached to a seat belt of the vehicle child safety seat.

2. Description of Related Art

Japanese Patent No. 4796049 describes a shoulder pad attached to a shoulder strap (a shoulder harness) of a seat belt so as to make contact with a shoulder of an occupant (a child) sitting on a child safety seat. The shoulder pad is formed such that a body portion made from a hard elastic material and a hold member (a substrate) having a plurality of openings are sewn up, and the body portion is provided with a plurality of projecting portions projecting from the plurality of openings of the hold member. Among the plurality of projecting portions, a projecting portion that makes contact with a chest of an occupant is set to be higher than a projecting portion that makes contact with the shoulder of the occupant. Hereby, at an initial stage of an accident, a body of the occupant is allowed to be bent forward, thereby reducing a load applied on a neck of the occupant. Meanwhile, at a subsequent stage of the accident, the higher projecting portion reaches the shoulder of the occupant, so as to restrain an overall forward movement of a head of the occupant.

In the meantime, a shoulder pad described in Japanese Patent Application Publication No. 2003-276559 (JP2003-276559 A) is attached to a shoulder harness of a seat belt, similarly to the shoulder pad described in Japanese Patent No. 4796049, and is placed between the shoulder harness and a shoulder of an occupant at the time of use. The shoulder pad is configured such that a friction-increasing surface provided on a shoulder-harness side is engaged with a shoulder strap at the time of a crash, so as to increase a frictional resistance to the shoulder harness, thereby limiting a forward movement of the occupant.

The shoulder pad described in Japanese Patent No. 4796049 may give uncomfortable feeling of roughness to the occupant, because the plurality of projecting portions makes contact with the shoulder of the occupant. Further, since a pressure receiving area is small, there is room for improvement in terms of improvement of an occupant restraint performance at the time of a vehicle crash.

In the meantime, the shoulder pad described in JP2003-276559 A has a large thickness, and is not provided with a deflection structure. On that account, it is considered that the shoulder pad makes local contact with the shoulder of the occupant at normal time. As a result, the occupant may receive a sense of being oppressed, and there is room for improvement in terms of improvement of comfortability.

SUMMARY OF THE INVENTION

The invention provides a vehicle child safety seat and a shoulder pad each of which is able to balance an occupant restraint performance at the time of a vehicle crash and comfortability at normal time.

A first aspect of the invention relates to a vehicle child safety seat. The vehicle child safety seat includes: a seat main body on which an occupant sits; a seat belt for restraining the occupant to the seat main body, the seat belt including a shoulder harness having a long belt shape and facing a shoulder of the occupant; and a shoulder pad including a hold member formed of a material having a flexibility into an elongated shape and placed between the shoulder of the occupant and the shoulder harness along a longitudinal direction of the shoulder harness, attached to the shoulder harness slidably in the longitudinal direction, and including a plurality of hard members formed of a material harder than the hold member and provided side by side at intervals therebetween in a longitudinal direction of the hold member, the plurality of hard members being attached to a shoulder-harness-side surface of the hold member.

In the above aspect, the shoulder pad is placed between the shoulder of the occupant sitting on the seat main body and the shoulder harness of the seat belt. The shoulder pad includes: the elongated hold member along the longitudinal direction of the shoulder harness; and the plurality of hard members provided side by side at intervals therebetween in a longitudinal direction of the hold member. The plurality of hard members is attached to the shoulder-harness-side surface of the hold member, and the hold member is placed between the plurality of hard members and the shoulder of the occupant. This makes it possible to prevent the occupant from feeling uncomfortable due to rough texture of the plurality of hard members. Besides, the hold member is formed of a material having a flexibility. This allows those parts of the hold member which are placed between the plurality of hard members to function as hinges. This accordingly allows the hold member to fit the shoulder of the occupant successfully. As a result, it is possible to ensure comfortability to the occupant.

Further, at the time of a vehicle crash, it is possible to support a load from the shoulder of the occupant successfully by the plurality of hard members placed between the shoulder harness and the hold member, and it is possible to ensure a pressure receiving area with respect to the shoulder of the occupant due to the hold member. This makes it possible to achieve a successful occupant restraint performance. Further, the plurality of hard members attached to the shoulder-harness-side surface of the hold member makes contact with the shoulder harness. This makes it possible to reduce a sliding resistance (frictional resistance) caused when the shoulder pad slides over the shoulder harness. Besides, by modifying the material and the shape of the plurality of hard members appropriately, it is possible to easily set and change an energy absorption property.

In the above aspect, the hold member may be formed of rubber, and the hard members may be formed of resin.

In the above aspect, the hold member of the shoulder pad is formed of rubber. Accordingly, it is possible to achieve a successful fitting property to the shoulder of the occupant, while ensuring durability of the hold member. Further, the plurality of hard members of the shoulder pad is formed of resin. This makes it possible to successfully ensure rigidity with respect to a load from the shoulder of the occupant.

In the above aspect, the hold member may include a tabular portion formed in an elongated plate shape where the longitudinal direction of the shoulder harness is taken as a longer side, and a plurality of hold portions provided on a shoulder-harness-side surface of the tabular portion and placed side by side at intervals therebetween in the longitudinal direction of the tabular portion. Each of the plurality of hold portions may include paired projecting portions projecting from respective end portions of the tabular portion in its width direction toward the shoulder harness and opened toward an inner side of the tabular portion in the width direction. Each of the hard members may be formed in an elongated shape where the width direction of the tabular portion is taken as a longer side, and configured such that respective end portions thereof in its longitudinal direction may be fitted to respective inner sides of the paired projecting portions.

In the above aspect, on a surface of the tabular portion provided in the hold member of the shoulder pad which surface faces the shoulder harness, the plurality of hold portions is placed side by side at intervals therebetween in the longitudinal direction of the tabular portion. Each of the hold portions includes paired projecting portions projecting from respective end portions of the tabular portion in the width direction toward the shoulder harness. The paired projecting portions are opened toward the inner side of the tabular portion in the width direction, and respective end portions of the hard member in its longitudinal direction are fitted to respective inner sides of the projecting portions. This allows the hard member to be successfully held by the hold member. Further, when the hard member is attached to the hold member, respective end portions of the hard member in the longitudinal direction are fitted to the respective inner sides of the paired projecting portions. Thus, an attachment operation is performed easily. Further, a center of the hard member in the longitudinal direction makes contact with the shoulder harness between the paired projecting portions. This makes it possible to successfully ensure slidability with respect to the shoulder harness.

In the above aspect, each of those paired hard members among the plurality of hard members which are attached to respective end portions of the hold member in the longitudinal direction may be provided with a connection portion to which the shoulder harness is connected slidably.

In the above aspect, among the plurality of hard members placed side by side in the longitudinal direction of the hold member of the shoulder pad, the pair hard members attached to the respective end portions of the hold member in the longitudinal direction are each provided with a connection portion to which the shoulder harness is connected slidably. This makes it possible to inhibit the shoulder pad from being displaced carelessly with respect to the shoulder harness in the width direction.

In the above aspect, each of those hard members among the plurality of hard members which are placed between the paired hard members may be provided with a rib portion that makes contact with the shoulder harness.

In the above aspect, each of those hard members (hereinafter referred to as non-connection hard members) among the plurality of hard members which are placed between the paired hard members to which the shoulder harness is connected is provided with a rib portion that makes contact with the shoulder harness. This makes it possible to reduce a contact area of the non-connection hard member with respect to the shoulder harness, thereby making it possible to reduce a frictional resistance to the shoulder harness. As a result, it is possible to achieve successful slidability of the shoulder pad with respect to the shoulder harness.

In the above aspect, the vehicle child safety seat may include a harness cover having paired insertion holes through which the shoulder harness is passed so that the harness cover is slidably attached to the shoulder harness, the harness cover covering the shoulder pad.

In the above aspect, the shoulder pad is covered with the harness cover slidably attached to the shoulder harness. The harness cover makes contact with the shoulder of the occupant. This consequently makes it possible to improve comfortability to the occupant.

In the above aspect, each of the plurality of hold portions may include paired displacement inhibition portions for connecting the paired projecting portions to each other in the width direction of the tabular portion, and each of the hard members may be fitted to between the paired displacement inhibition portions.

In the above aspect, the tabular portion may have through holes formed in parts opposed to the projecting portions.

A second aspect of the invention relates to a shoulder pad. The shoulder pad includes: a hold member formed of a material having a flexibility, and including a tabular portion formed in an elongated plate shape and a plurality of hold portions provided on one surface of the tabular portion so as to be placed side by side at intervals therebetween in a longitudinal direction of the tabular portion; and a plurality of hard members including paired connection hard members held by paired hold portions placed at respective end portions of the hold member in its longitudinal direction, and one or more non-connection hard members held by the hold portions between the paired connection hard members, the paired connection hard members and the one or more non-connection hard members being formed of a material that is harder than the hold member, wherein each of the paired connection hard members is provided with a connection portion for slidably connecting thereto a shoulder harness provided in a seat belt of a vehicle child safety seat.

In the above aspect, on one surface of the tabular portion provided in the hold member, the plurality of hold portions is placed side by side at intervals therebetween in the longitudinal direction of the tabular portion. The plurality of hard members is held by the plurality of hold portions. The plurality of hard members includes: the paired connection hard members held by the paired hold portions placed at respective end portions of the hold member in the longitudinal direction; and one or more non-connection hard members held by the hold portions between the paired connection hard members. Each of the paired connection hard members is provided with the connection portion for slidably connecting thereto the shoulder harness provided in the seat belt of the vehicle child safety seat. Accordingly, when the shoulder harness is connected to each of the connection portions, it is possible to attach the shoulder pad to the shoulder harness, thereby allowing the shoulder pad to be placed between the shoulder of the occupant sitting on the child safety seat and the shoulder harness.

Besides, in a state where the shoulder pad is attached to the shoulder harness, the paired connection hard members each provided with the connection portion for the shoulder harness, and the non-connection hard members placed between the paired connection hard members are placed on that side of the tabular portion of the hold member which faces the shoulder harness. Accordingly, the tabular portion of the hold member is placed between the connection and non-connection hard members (the plurality of hard members) and the shoulder of the occupant. This makes it possible to inhibit the occupant from feeling uncomfortable due to rough texture of the plurality of hard members. Further, the hold member is formed of a material having a flexibility. This allows those parts of the hold member which are placed between the plurality of hard members to function as hinges. This accordingly allows the hold member to fit the shoulder of the occupant successfully. As a result, it is possible to ensure comfortability to the occupant.

Further, at the time of a vehicle crash, it is possible to support a load from the shoulder of the occupant successfully by the plurality of hard members placed between the shoulder harness and the tabular portion, and it is possible to ensure a pressure receiving area with respect to the shoulder of the occupant due to the tabular portion. This makes it possible to achieve a successful occupant restraint performance. Further, the plurality of hard members attached to a shoulder-harness-side surface of the tabular portion of the hold member makes contact with the shoulder harness. This makes it possible to reduce a sliding resistance (frictional resistance) caused when the shoulder pad slides over the shoulder harness. Besides, by modifying the material and the shape of the plurality of hard members appropriately, it is possible to easily set and change an energy absorption property.

In the above aspect, each of the plurality of hold portions may include paired projecting portions projecting from respective end portions of the tabular portion in its width direction and opened toward an inner side of the tabular portion in the width direction. Each of the plurality of hold portions may include paired displacement inhibition portions for connecting the paired projecting portions to each other in the width direction of the tabular portion. Each of the hard members may be fitted to between the paired displacement inhibition portions.

In the above aspect, each of the plurality of hold portions may include paired projecting portions projecting from respective end portions of the tabular portion in its width direction and opened toward an inner side of the tabular portion in the width direction. The tabular portion may have through holes formed in parts opposed to the projecting portions.

As discussed above, according to the first and second aspects of the invention, it is possible to balance an occupant restraint performance at the time of a vehicle crash and comfortability at normal time.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes a vehicle child safety seat 10 and a shoulder pad 18 according to an embodiment of the invention with reference to FIGS. 1 to 12. Note that an arrow FR shown in each drawing appropriately indicates a vehicle front direction, and an arrow UP indicates a vehicle upper direction, and an arrow W indicates a vehicle width direction.

(Overall Configuration)

Figure 1:
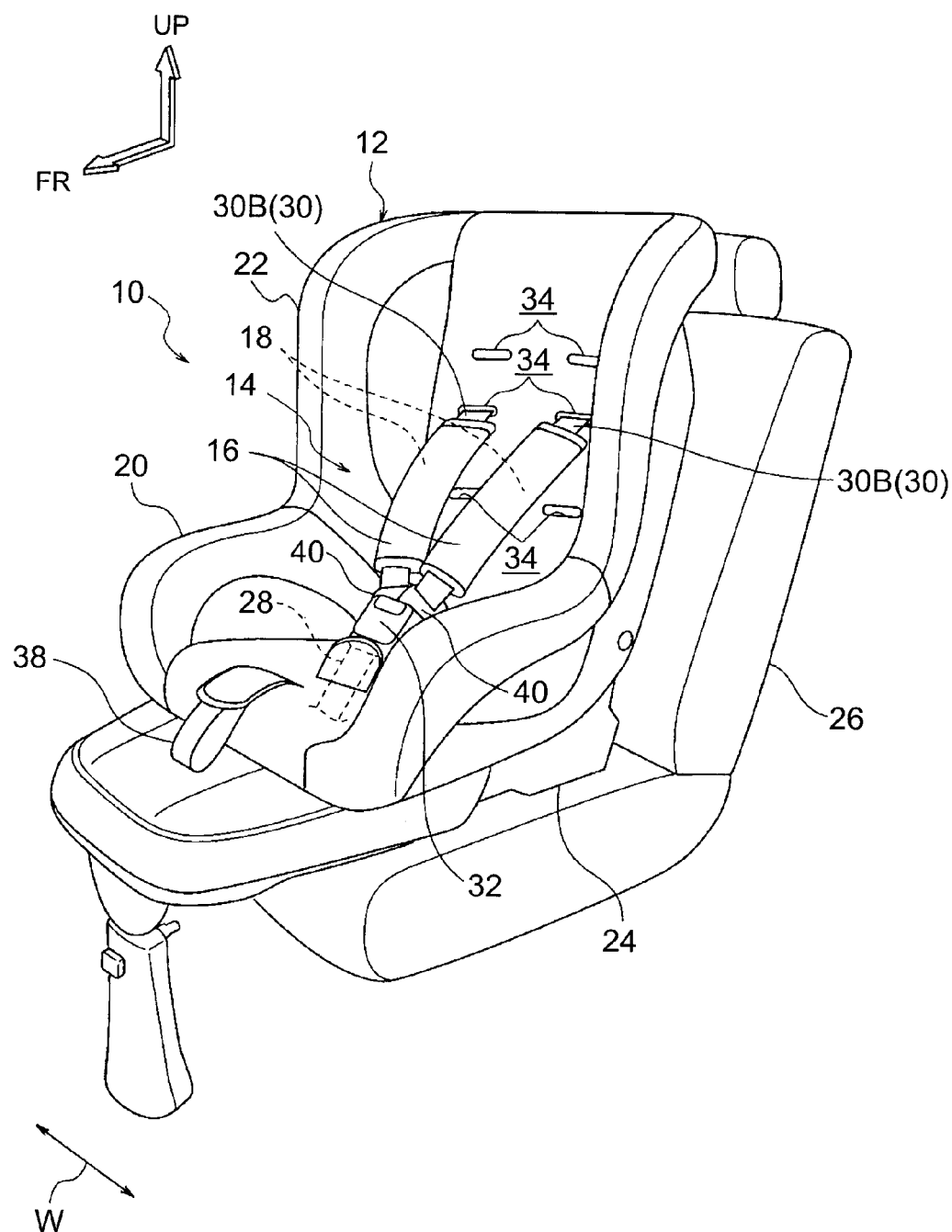
FIG. 1 is a perspective view illustrating a state where a vehicle child safety seat is attached to a vehicle seat, when viewed from a diagonal front side.
Figure 2:
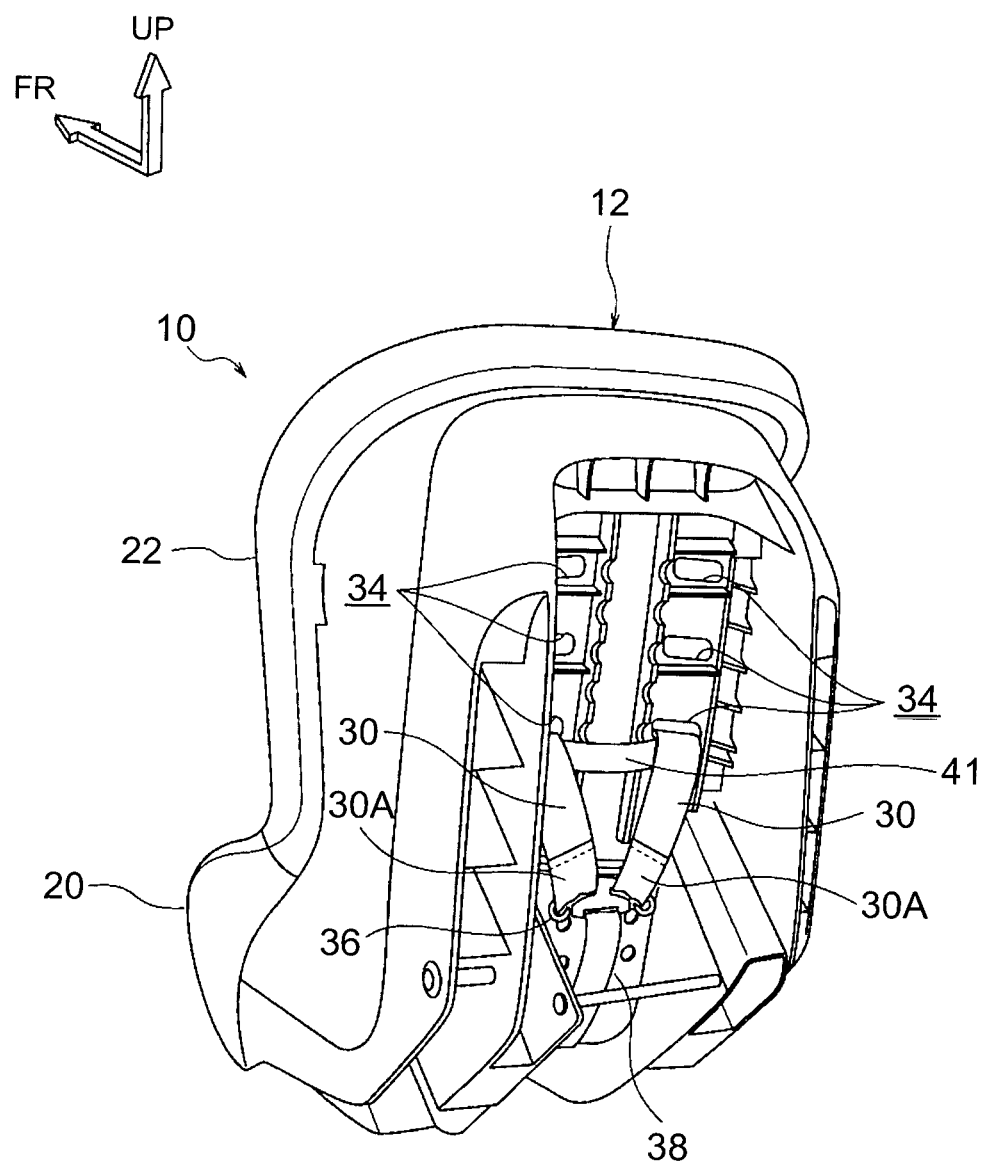
FIG. 2 is a perspective view of a vehicle child safety seat according to an embodiment of the invention, when viewed from a diagonal rear side.

As illustrated in FIGS. 1 and 2, the vehicle child safety seat 10 according to the present embodiment includes a seat main body 12. The seat main body 12 is provided with a seat belt 14, and paired right and left harness covers 16 are attached to the seat belt 14. Respective shoulder pads 18 (see FIG. 3) are accommodated inside harness covers 16. The following describes each constituent.

(Configuration of Seat Main Body 12)

The seat main body 12 includes a seat cushion 20 on which a baby or infant occupant P (see FIG. 3) sits, and a seat back 22 serving as a backrest for the occupant P. The seat main body 12 is fixed to a vehicle seat 26 via a base 24 (see FIG. 1) in accordance with ISOFIX, which is an international standard correspondence. Note that how to fix the seat main body 12 is not limited to the above. The seat main body 12 may be configured so as to be fixed to the vehicle seat 26 by means of a seat belt provided in a vehicle or the vehicle seat 26.

(Configuration of Seat Belt 14)

The seat belt 14 is intended to restrain the occupant P to the seat main body 12, and includes a crotch strap 28 and paired right and left shoulder harnesses 30 as illustrated in FIG. 1. The crotch strap 28 and the right and left, shoulder harnesses 30 are formed in a long belt shape. One end portion of the crotch strap 28 in its longitudinal direction is fixed to a vicinity of a central part of the seat cushion 20, and a buckle 32 is fixed to the other end portion of the crotch strap 28 in the longitudinal direction.

One end portion of the left shoulder harness 30 in its longitudinal direction is fixed to a rear end portion of the seat cushion 20 on its left side. One end portion of the right shoulder harness 30 in its longitudinal direction is fixed to a rear end portion of the seat cushion 20 on its right side. Further, the other ends of the right and left shoulder harnesses 30 in the longitudinal direction are passed through paired right and left slots 34 (shoulder-harness through holes) formed in the seat back 22, and are drawn out to a back-face side of the seat back 22. A plurality of pairs (three pairs herein) of right and left slots 34 is formed side by side in a height direction of the seat back 22, so that the shoulder harnesses 30 are passed through appropriate slots 34 in accordance with a sitting height of the occupant P.

At illustrated in FIG. 2, respective latching portions 30A are provided in those other end portions of the right and left shoulder harnesses 30 in the longitudinal direction which are drawn out to the back-face side of the seat back 22. The respective latching portions 30A are formed in a loop shape such that the other end portions of the right and left shoulder harnesses 30 in the longitudinal direction are folded and sewn. The latching portions 30A are removably latched to a hanger 36, which is a substantially T-shaped latching metal fitting provided on the back-face side of the seat back 22. One end portion of a harness adjuster 38 in its longitudinal direction, which harness adjuster 38 is an adjusting belt, is fixed to the hanger 36. The harness adjuster 38 extends to a bottom side of the seat cushion 20. The other end portion of the harness adjuster 38 in the longitudinal direction is drawn out to a front-face side of the seat cushion 20 (see FIG. 1).

Respective tang plates 40 are slidably attached to intermediate parts of the right and left shoulder harnesses 30 in the longitudinal direction, on a front-face side of the seat back 22. When the occupant P sitting on the seat main body 12 puts on the seat belt 14, the right and left shoulder harnesses 30 are put around right and left shoulders S (see FIG. 3), and the right and left tang plates 40 are combined and connected to the buckle 32. When the harness adjuster 38 is subsequently pulled toward a front side of the seat cushion 20, those other end portions of the right and left shoulder harnesses 30 in the longitudinal direction which are latched to the hanger 36 are pulled downward. As a result, slack of the intermediate parts in the longitudinal direction of the right and left shoulder harnesses 30 is removed. Hereby, the occupant P is in a seat belt fitting state. In this fitting state, the right and left shoulder harnesses 30 face the right and left shoulder S of the occupant P (see FIG. 3).

(Configuration of Harness Cover 16)

Figure 4:
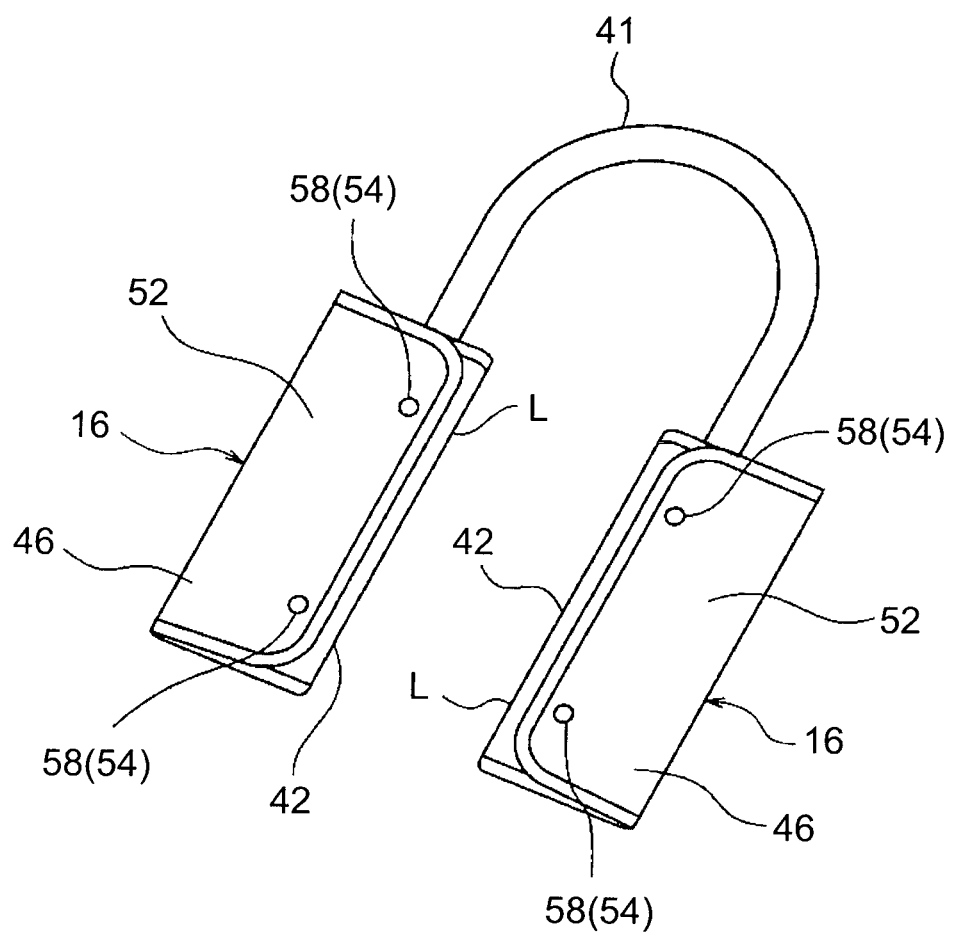
FIG. 4 is a perspective view illustrating a harness cover included in the vehicle child safety seat according to the embodiment of the invention.

The right and left harness covers 16 are each formed such that a sheet material (a fabric material 46 illustrated in FIGS. 4 and 5) having a flexibility is sewn, and are attached to the right and left shoulder harnesses 30 so as to make contact with the right and left shoulders S of the occupant P. The right and left harness covers 16 are connected to each other via a strap 41, as illustrated in FIG. 4.

Figure 5:
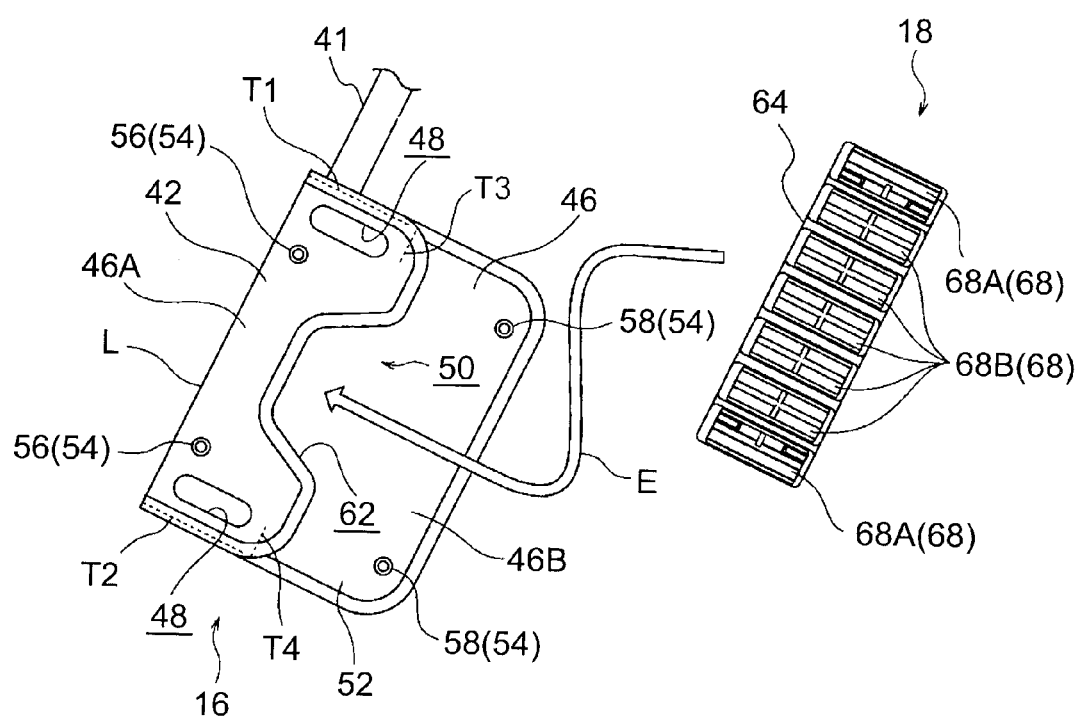
FIG. 5 is a perspective view illustrating the harness cover according to the embodiment of the invention and a shoulder pad accommodated in the harness cover.

Each of the harness covers 16 includes a body portion 42 formed in a long pouch shape, as illustrated in FIG. 5. The body portion 42 is formed such that the fabric material 46 cut out into in a substantially rectangular shape is folded along a fold line L, and one side portion 46A of the fabric material 46 and the other side portion 46B thereof via the fold line L are sewn up at sewing portions T1, T2 placed at respective end portions of the body portion 42 in its longitudinal direction.

Paired insertion holes 48 are formed in the respective end portions of the body portion 42 in the longitudinal direction. The paired insertion holes 48 are formed on the one side portion 46A of the fabric material 46, and are each formed in a long hole that is elongated along a width direction of the body portion 42. A part (hereinafter referred to as a restraint portion 30B) of the intermediate part of the shoulder harness 30 in the longitudinal direction which part is placed between the slot 34 and the tang plate 40 is passed through the insertion holes 48. Hereby, the body portion 42 is attached to the shoulder harness 30 slidably in its longitudinal direction. In this attachment state, the longitudinal direction of the body portion 42 coincides with the longitudinal direction of the shoulder harness 30, and the width direction of the body portion 42 coincides with a width direction of the shoulder harness 30.

One end portion (an end portion opposite to the fold line L) of the body portion 42 in the width direction is not sewn, and an opening 50 that is opened toward one side of the shoulder harness 30 in the width direction is formed. The opening 50 is formed in an elongated shape with the longitudinal direction of the body portion 42 being taken as a longer side. On respective sides of the opening 50 in its longitudinal direction, the one side portion 46A of the fabric material 46 and the other side portion 46B thereof are sewn up at sewing portions T3, T4 (see FIG. 5) for inhibiting shoulder-pad falling. Hereby, a linear dimension of the opening 50 is shorter than a linear dimension of the body portion 42. Note that the sewing portions T3, T4 may be omitted such that the sewing portions T1, T2 are extended to areas where the sewing portions T3, T4 are provided.

A door portion 52 is extended from an edge portion of the opening 50 in the body portion 42. The door portion 52 is constituted by the other side portion 46B of the fabric material 46. As illustrated in FIG. 4, the door portion 52 is folded toward the body portion 42 so as to cover the opening 50 and the paired insertion holes 48, and is latched to the body portion 42 by means of paired snap buttons 54 serving as a door latch portion. Each of the snap buttons 54 is constituted by a projection member 56 fixed to the body portion 42, and a recessed member 58 fixed to the door portion 52. When the projection member 56 separably engages with the recessed member 58, the door portion 52 is latched to, the body portion 42. Note that the door latch portion is not limited to the above, and is modifiable appropriately. For example, a hook-and-loop fastener and the like can be used as the door latch portion.

Figure 3:
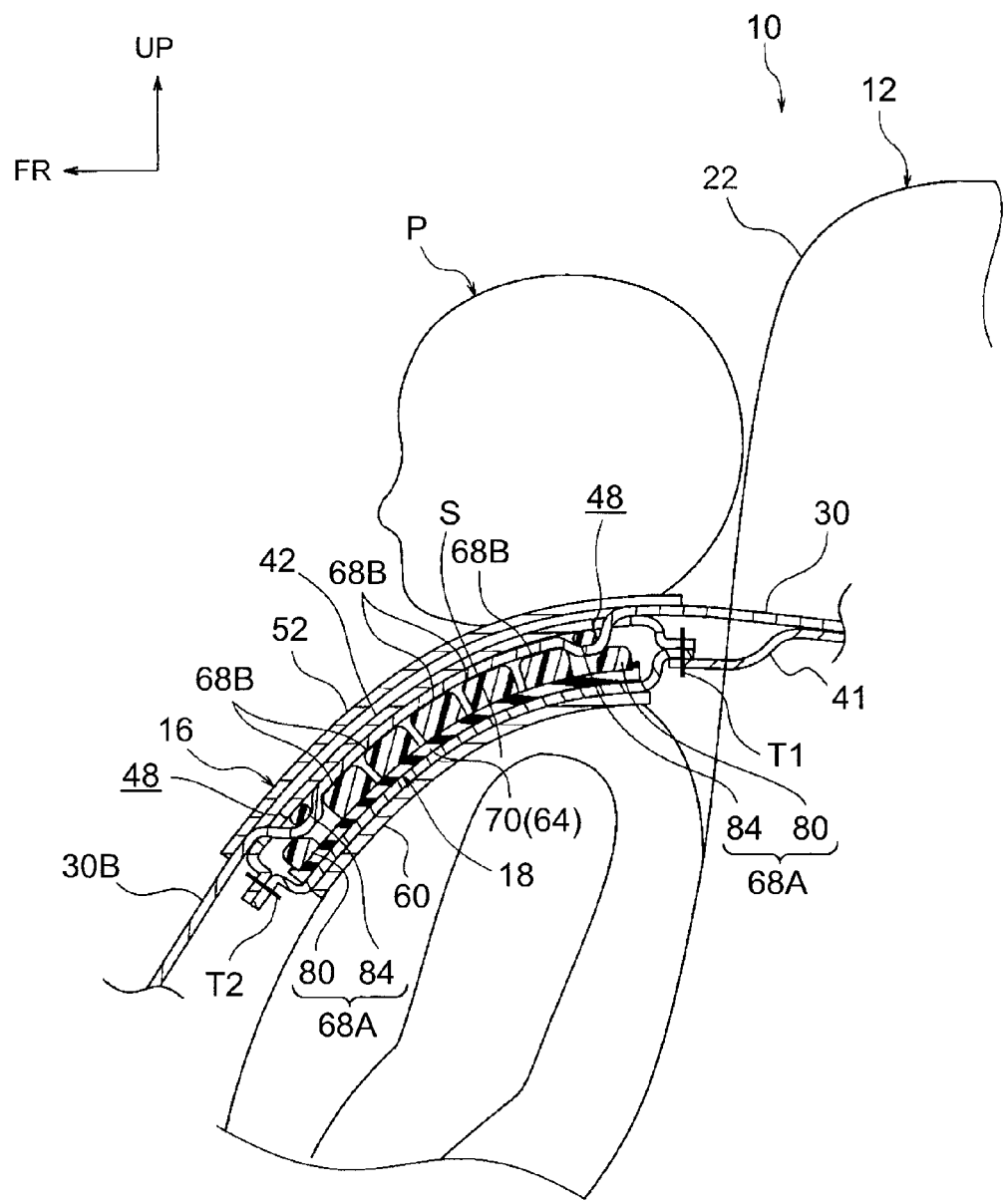
FIG. 3 is a sectional view illustrating a partial configuration of the vehicle child safety seat according to the embodiment of the invention, and illusstrating a state where an occupant is restrained by a seat belt of the vehicle child safety seat, when viewed from a seat-width direction.

Further, as illustrated in FIG. 3, a nonslip portion 60 formed in a sheet shape is attached to that surface of the body portion 42 which faces the shoulder S of the occupant P (that surface of the other side portion 46B of the fabric material 46 which is opposite to a side facing the one side portion 46A). The nonslip portion 60 is formed, for example, of synthetic leather, and is fixed to the body portion 42 by sewing or the like. A coefficient of friction on that surface of the nonslip portion 60 which makes contact with the shoulder S of the occupant P is set to be higher than a coefficient of surface friction of the body portion 42.

Further, as illustrated in FIG. 5, the body portion 42 includes a cutout portion 62 formed in the edge portion of the opening 50 (a portion constituted by the one side portion 46A) toward a side opposite to a side where the door portion 52 is extended. The cutout portion 62 is formed in a central part of the body portion 42 in its longitudinal direction, and is cut out in a substantially rectangular shape toward the fold line L.

Further, as illustrated in FIG. 4, the right and left harness covers 16 are formed symmetrically. The harness covers 16 are passed through the right and left slots 34 from the back-face side of the seat back 22, and are drawn out to the front-face side of the seat back 22. Hereby, an intermediate part of the strap 41 in its longitudinal direction is hooked on the back-face side of the seat back 22, as illustrated in FIG. 2, and the right and left harness covers 16 are connected to the seat back 22. The respective shoulder pads 18 are accommodated inside the right and left harness covers 16.

(Configuration of Shoulder Pad 18)

Figure 6:
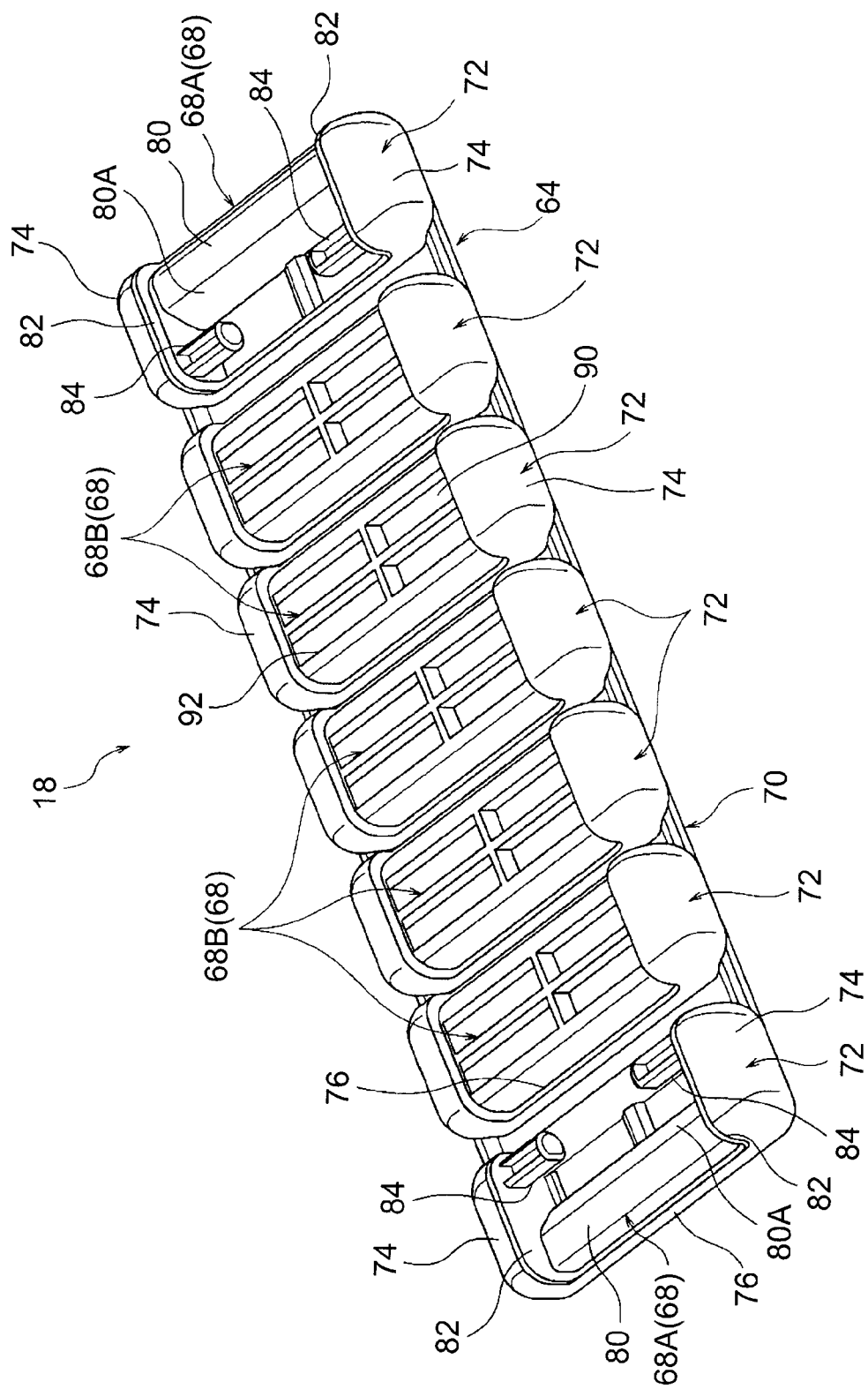
FIG. 6 is an enlarged perspective view of the shoulder pad according to the embodiment of the invention.
Figure 7:
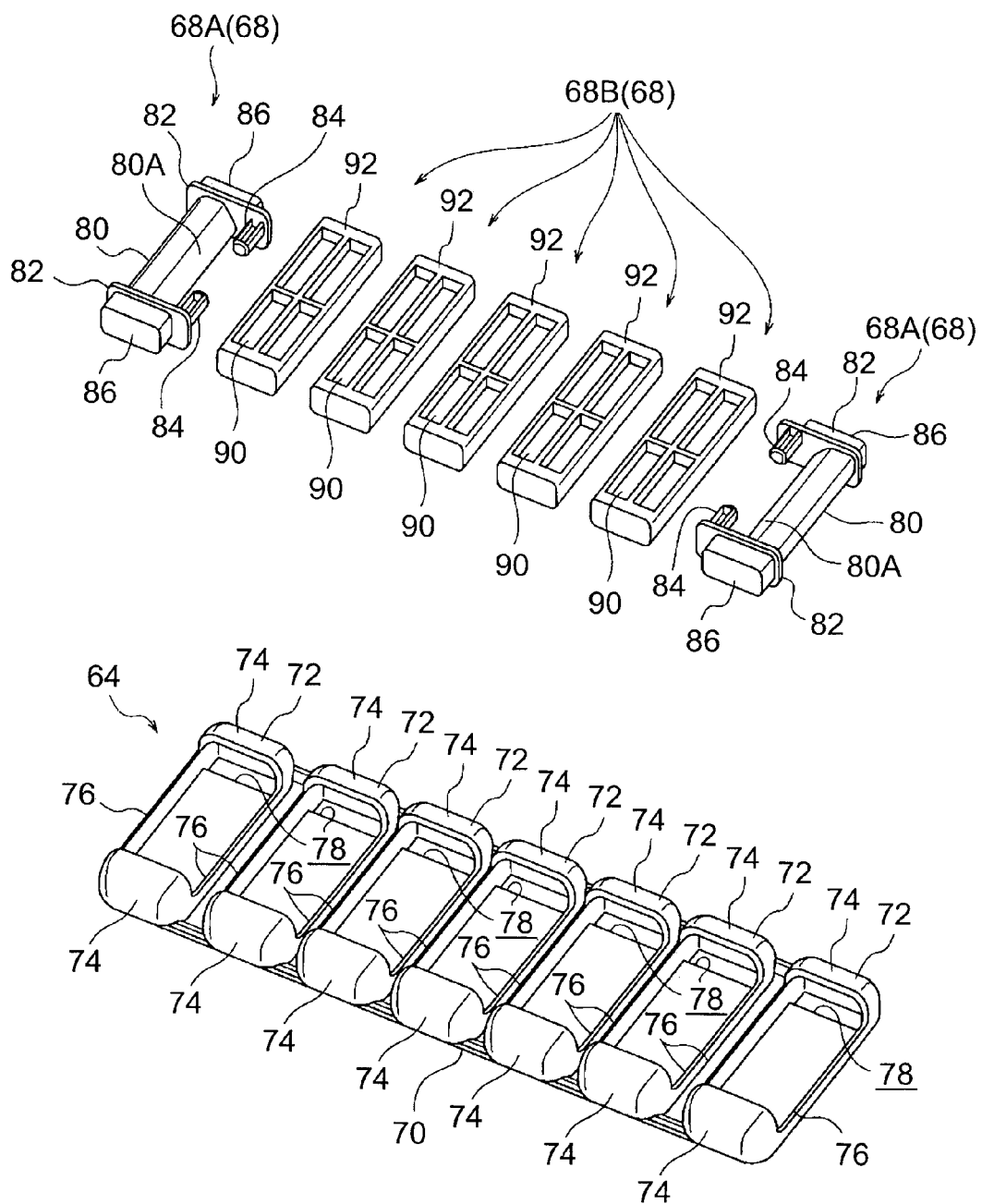
FIG. 7 is an exploded perspective view of the shoulder pad according to the embodiment of the invention.

As illustrated in FIGS. 6 and 7, the shoulder pad 18 is provided as a different member from the harness cover 16. The shoulder pad 18 is constituted by a hold member 64 formed of a material (elastomer rubber, herein) having a flexibility, and a plurality of (seven, herein) inserts 68 (hard members) formed of a material (resin such as polypropylene, herein) that is harder than the material of the hold member 64.

Figure 8:
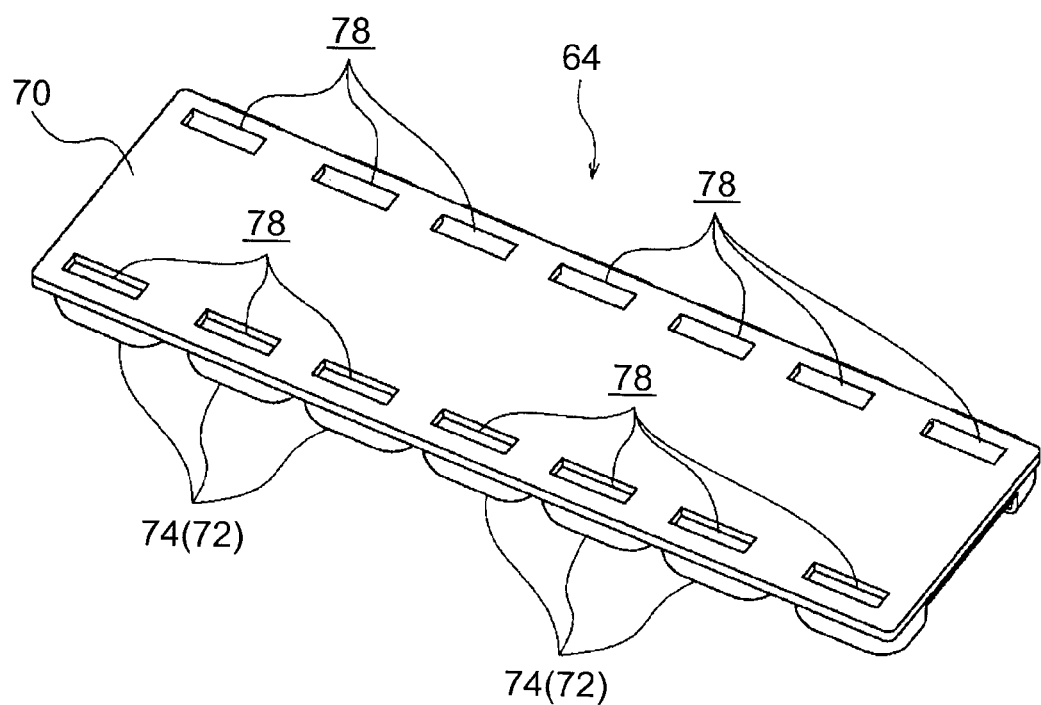
FIG. 8 is a perspective view of a hold member, which is a constituent member of the shoulder pad according to the embodiment of the invention, when viewed from a back side thereof.

As illustrated in FIGS. 7 and 8, the hold member 64 is constituted by a tabular portion 70 formed in an elongated plate shape, and a plurality of (seven, herein) hold portions 72 formed on one surface of the tabular portion 70. The hold member 64 is formed in an elongated and substantially plate shape as a whole.

The plurality of hold portions 72 is provided side by side at some intervals in a, longitudinal direction of the tabular portion 70. Each of the hold portions 72 includes paired projecting portions 74 projecting from respective end portions of the tabular portion 70 in its width direction, and paired displacement inhibition portions 76 for connecting the paired projecting portions 74 in the width direction of the tabular portion 70. Each of the hold portions 72 is formed in a frame shape, when viewed from a thickness direction of the tabular portion 70.

Each of the projecting portions 74 is formed in an elongated shape along the longitudinal direction of the tabular portion 70, and is opened toward an inner side of the tabular portion 70 in the width direction. Further, a space between the paired the projection portions 74 is set to be wider than a width dimension of the shoulder harness 30. A projection height of the paired displacement inhibition portions 76 from the tabular portion 70 is set to be lower than that of the paired projecting portions 74, and the paired displacement inhibition portions 76 are provided over between respective end portions of the paired projecting portions 74 in their longitudinal direction.

As illustrated in FIG. 8, a through hole 78 having a substantially rectangular shape is formed at that part of the tabular portion 70 which faces each of the projecting portions 74. When the hold member 64 is molded, protrusions provided in a die to form the projecting portions 74 are inserted into these through holes 78. This allows the hold member 64 to be, molded without using a slide mold.

In the meantime, the plurality of inserts 68 is constituted by paired connection inserts 68A (hard members for connection) that are held by paired hold portions 72 placed at respective end portions of the hold member 64 in the longitudinal direction, and a plurality of non-connection inserts 68B (non-connection hard members) respectively held by a plurality of hold portions 72 (five hold portions 72, herein) placed between the paired hold portions 72. The connection inserts 68A and the non-connection inserts 68B are formed in an elongated shape where the width direction of the tabular portion 70 is taken as a longer side, and have a linear dimension that is set to be sufficiently larger than a width dimension of the shoulder harness 18.

The paired connection inserts 68A are each constituted by an inner guide portion 80 formed in an elongated and substantially prismatic shape where the width direction of the tabular portion 70 is taken as a longer side, paired side walls 82 extended in a substantially rib shape from respective end portions of the inner guide portion 80 in its longitudinal direction, paired guide claws 84 (outer guide portions) projecting from the paired side walls 82 into a direction where the paired guide claws 84 come closer to each other, and paired engageable portions 86 projecting from surfaces of the paired side walls 82 which surfaces are opposite to surfaces that face the inner guide portion 80. The inner guide portion 80 and the paired guide claws 84 constitute a connection portion for slidably connecting the shoulder pad 18 to the shoulder harness 30. The paired guide claws 84 (outer guide portions) are separated from each other in a width direction of the shoulder harness 30.

The paired engageable portions 86 (respective end portions in the longitudinal direction) in each of the connection inserts 68A are fitted to respective inner sides of the paired projecting portions 74 of the hold portion 72 that is placed at an end portion of the hold member 64 in its longitudinal direction. Further, each of the connection inserts 68A fits in between the paired displacement inhibition portions 76, so that displacement thereof in the longitudinal direction of the tabular portion 70 is regulated. Hereby, each of the connection inserts 68A is held by its corresponding end portion of the hold member 64 in the longitudinal direction.

The paired connection inserts 68A are formed to have the same shape. The paired guide claws 84 are placed so as to deviate from the inner guide portion 80 in the longitudinal direction of the tabular portion 70, while deviating therefrom in a direction where the paired guide claws 84 are separated from the tabular portion 70. Not that the paired connection inserts 68A are attached to the hold member 64 in different orientations. That is, each of the paired connection inserts 68A is attached to the hold member 64 such that its paired guide claws 84 are placed closer to a center of the tabular portion 70 in the longitudinal direction relative to its inner guide portion 80.

Figure 9:
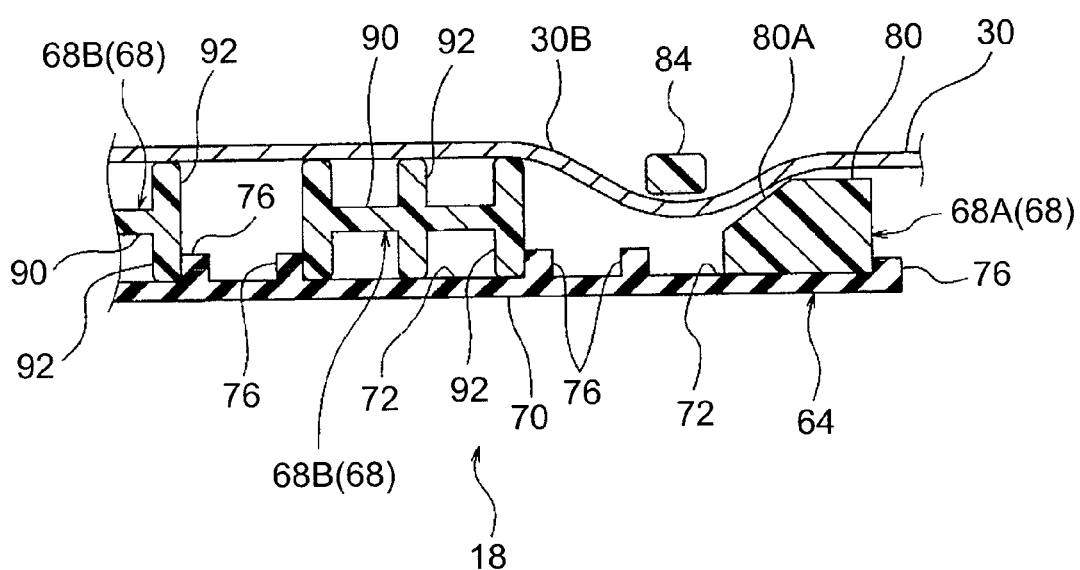
FIG. 9 is an expanded sectional view illustrating a configuration around a connection portion of a shoulder harness in the shoulder pad according to the embodiment of the invention.
Figure 10:
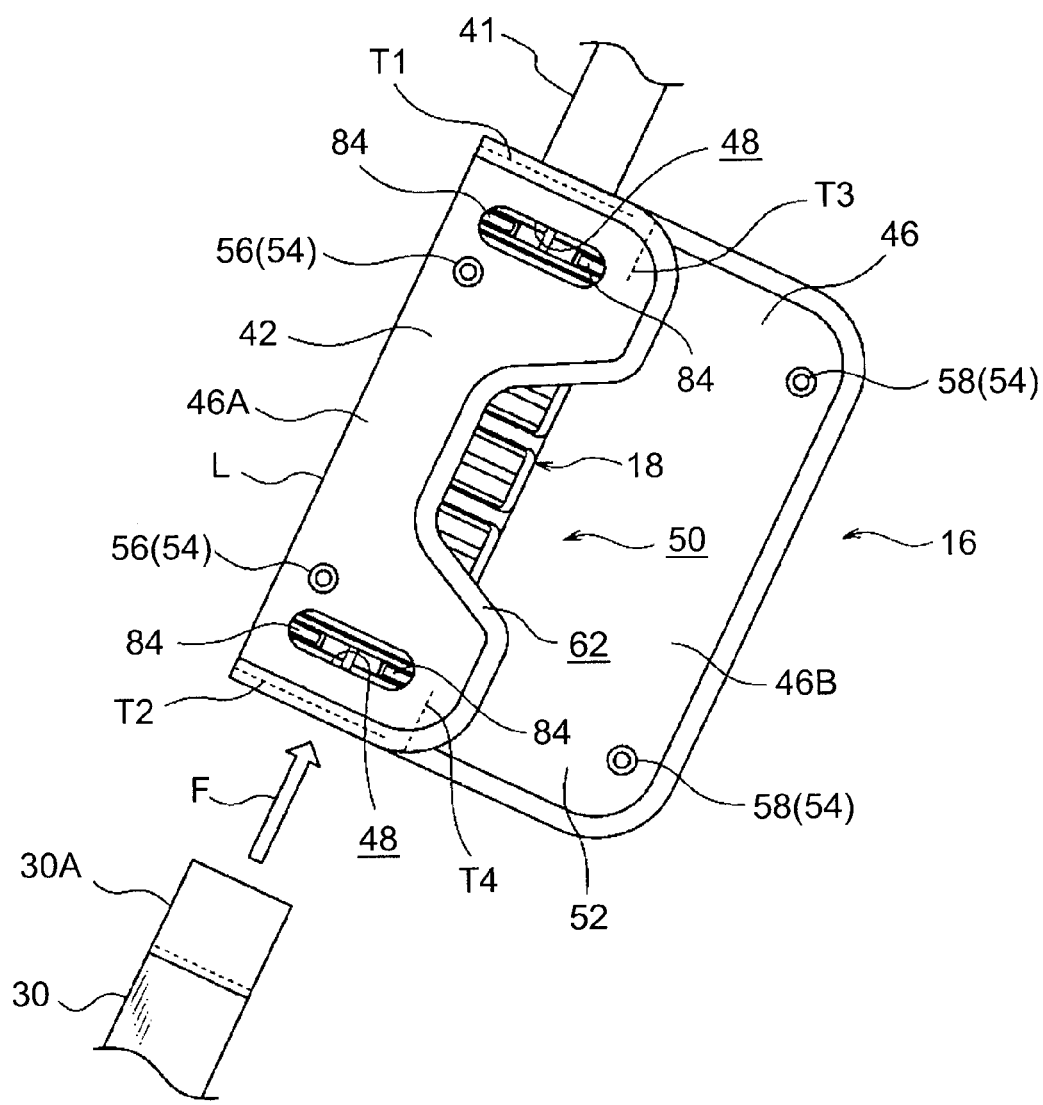
FIG. 10 is a perspective view to describe how to attach, to the shoulder harness, the harness cover that accommodates therein the shoulder pad according to the embodiment of the invention.
Figure 11:
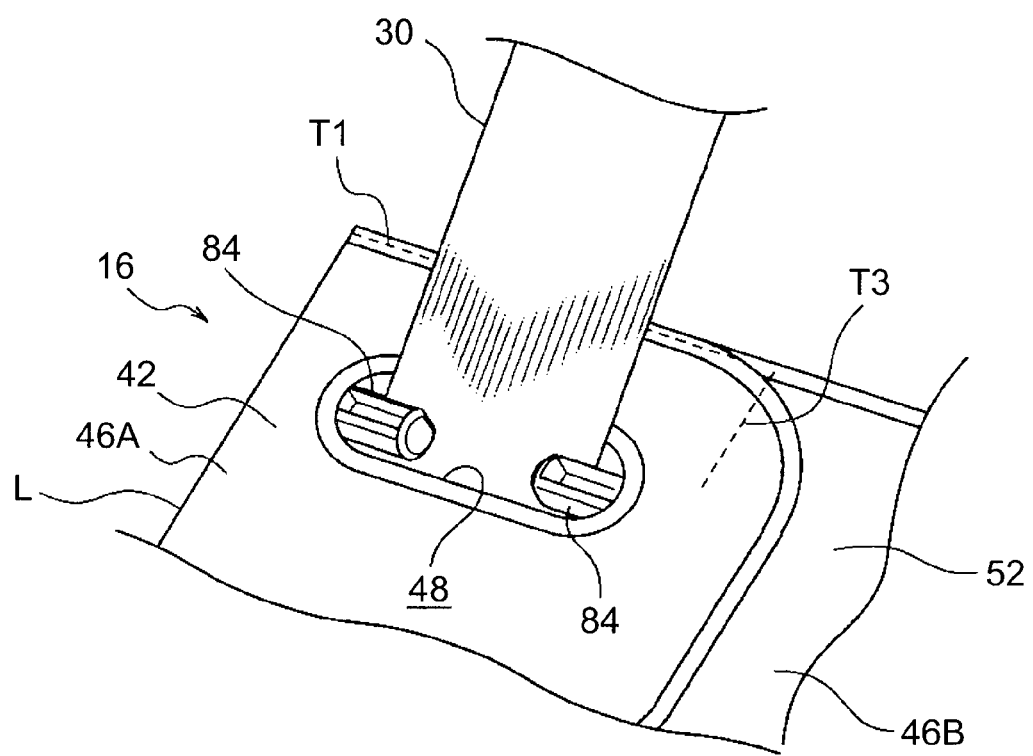
FIG. 11 is an enlarged perspective view illustrating a state where the shoulder harness is passed through an insertion hole of the harness cover according to the embodiment of the invention and paired guiding claws of the shoulder pad are engaged with the shoulder harness.

Further, as illustrated in FIG. 9, the inner guide portion 80 of each of the connection inserts 68A is provided with a guide surface 80A inclined or curved (inclined, herein) so that its projection height from the tabular portion 70 is decreased as the guide surface 80A goes toward a center of the hold member 64 in its longitudinal direction, and the guide surface 80A faces the paired guide claws 84.

In the meantime, the non-connection insert 68B is constituted by a member main body 90 formed in an elongated plate shape, and a rib portion 92 provided on either side of the member main body 90. The non-connection insert 68B is configured such that both sides of the member main body 90 have the same configuration, and the non-connection insert 68B is formed in an elongated and substantially plate shape as a whole. Note that, in the present embodiment, three longitudinal ribs extending in a longitudinal direction of the member main body 90, and three lateral ribs extending in a width direction of the member main body 90 are connected in a lattice shape (a cross inside a square shape), thereby constituting the rib portion 92. However, a shape of the rib portion is not limited to this, and is modifiable appropriately.

Each of the plurality of non-connection inserts 68B is configured such that respective end portions thereof in its longitudinal direction are fitted to inner sides of the paired projecting portions 74 of its corresponding hold portion 72. Further, each of the plurality of non-connection inserts 68B fits in between the paired displacement inhibition portions 76 of the corresponding hold portion 72, so that displacement of the each of the plurality of non-connection inserts 68B in the longitudinal direction of the tabular portion 70 is regulated. Hereby, the plurality of non-connection inserts 68B is attached to a central side of the hold member 64 in its longitudinal direction between the paired connection inserts 68A.

(Further Description of the Present Embodiment)

The shoulder pad 18 having the above configuration is accommodated in the body portion 42 of the harness cover 16 and is covered with the harness cover 16. As illustrated in FIG. 3, the shoulder pad 18 in the harness cover 16 is placed so that the longitudinal direction of the hold member 64 (the longitudinal direction of the tabular portion 70) goes along a longitudinal direction of the restraint portion 30B of the shoulder harness 30, and the plurality of inserts 68 is placed at a shoulder-harness-30 side relative to the tabular portion 70. Accordingly, in a state where the occupant P puts on the seat belt 14, the tabular portion 70 of the hold member 64 is placed between the shoulder S of the occupant P and the plurality of inserts 68. Note that FIG. 3 schematically illustrates the plurality of inserts 68.

As illustrated in FIGS. 3 and 9, the restraint portion 30B of the shoulder harness 30 is passed through between the paired guide claws 84 and the inner guide portion 80 in each of the paired connection inserts 68A. The paired guide claws 84 face (engage with) a surface of the shoulder harness 30 which surface is opposite to a side facing the occupant, and the inner guide portion 80 faces (engages with) a surface of the shoulder harness 30 which surface faces the occupant. Hereby, the shoulder pad 18 is connected to the shoulder harness 30 slidably in its longitudinal direction, and displacement of the shoulder pad 18 in its width direction relative to the shoulder harness 30 is regulated. That part of the restraint portion 30B of the shoulder harness 30 which is placed between the paired connection inserts 68A makes contact with the non-connection inserts 68B. On that account, when the shoulder pad 18 slides over the shoulder harness 30 in the longitudinal direction, the rib portions 92 of the non-connection inserts 68B slide over and come in contact with the shoulder harness 30. Further, as described above, the displacement of the shoulder pad 18 in the width direction relative to the shoulder harness 30 is regulated. Thus, the rubber hold member 64 is configured so as not to make contact with the shoulder harness 30.

The shoulder pad 18 is formed slightly smaller in size than the body portion 42 of the harness cover 16. That is, the shoulder pad 18 is configured so as to be accommodated in the body portion 42, without play. Accordingly, the shoulder pad 18 slides integrally with the harness cover 16 relative to the shoulder harness 30 in the longitudinal direction.

The paired insertion holes 48 of the harness cover 16 are each formed at a position that faces the paired guide claws 84 of each of the connection inserts 68A. The paired guide claws 84 are exposed outside the body portion 42 via their corresponding insertion hole 48. Further, in the present embodiment, the paired connection inserts 68A and the plurality of non-connection inserts 68B have a color different from that of the shoulder harness 30. For example, the paired connection inserts 68A and the plurality of non-connection insert 68B are molded from pink resin, while the shoulder harness 30 is formed of a black fiber.

Further, the opening 50 is formed in the body portion 42 of the harness cover 16 as previously described, so that the shoulder pad 18 is able to be put in and out via the opening 50. Note that the linear dimension of the opening 50 is set to be shorter than the linear dimension of the shoulder pad 18. When the shoulder pad 18 is put in and out from the body portion 42, the shoulder pad 18 is bent.

(Attachment of Harness Cover 16 and Shoulder Pad 18)

When the harness cover 16 and the shoulder pad 18 as described above are attached to the shoulder harness 30, the shoulder pad 18 is initially inserted in the body portion 42 via the opening 50 of the harness cover 16 as shown by an arrow E in FIG. 5. Subsequently, the latching portion 30A of the shoulder harness 30 (the other end portion thereof in the longitudinal direction) is inserted in the body portion 42 from one of the insertion holes 48 of the body portion 42 as shown by an arrow F in FIG. 10, and then drawn out from the other one of the insertion holes 48 to outside of the body portion 42. At this time, the shoulder harness 30 is passed through between the paired guide claws 84 and the inner guide portion 80 in each of the connection inserts 68A (see FIG. 11). Subsequently, the door portion 52 of the harness cover 16 is folded toward the body portion 42, and is latched to the body portion 42 by means of the paired snap buttons 54.

That latching portion 30A of the shoulder harness 30 which is drawn out to the outside of the body portion 42 is passed through the slot 34 of the seat back 22, and is latched to the hanger 36 on the back-face side of the seat back 22. Hereby, the attachment of the harness cover 16 and the shoulder pad 18 with respect to the shoulder harness 30 is completed.

Figure 12:
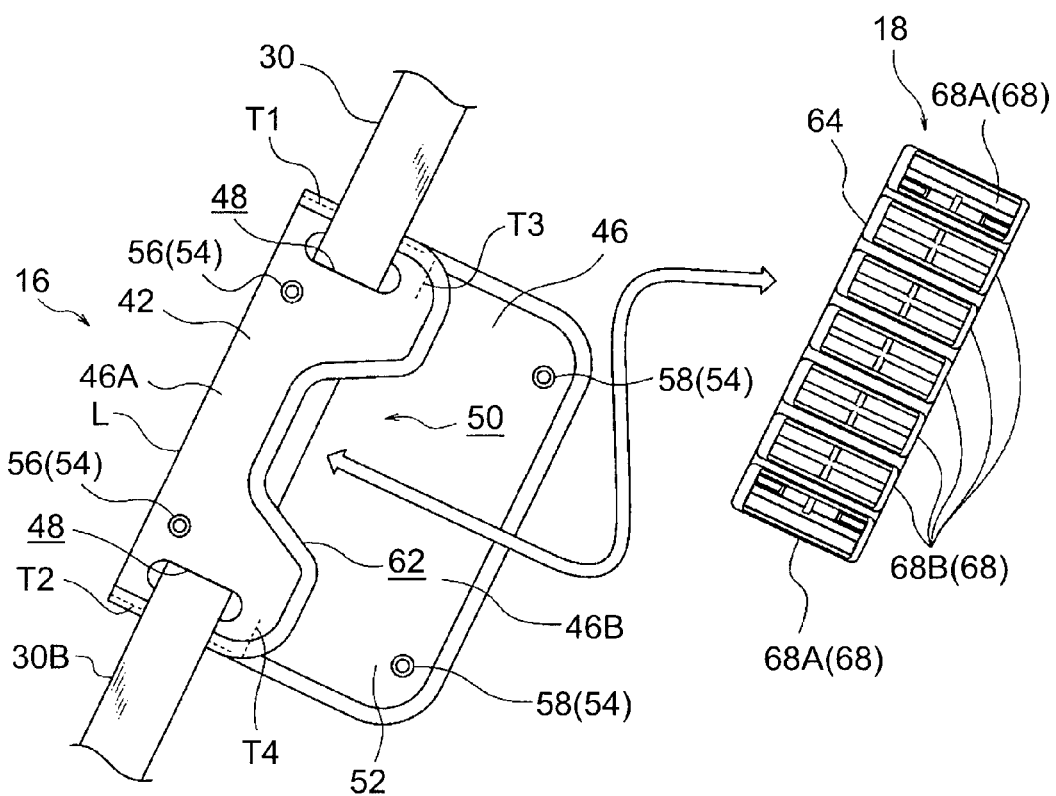
FIG. 12 is a perspective view to describe a state at the time when the shoulder pad is put in and out from the harness cover attached to the shoulder harness according to the embodiment of the invention.

Further, in the present embodiment, the harness cover 16 includes the opening 50 via which the shoulder pad 18 is put in and out. In view of this, as illustrated in FIG. 12, even in a state (hereinafter referred to as a cover attachment state) where the harness cover 16 is attached to the shoulder harness 30, it is possible to attach the shoulder pad 18 to and remove the shoulder pad 18 from the harness cover 16 and the shoulder harness 30.

For example, in the cover attachment state, in order to remove the shoulder pad 18 from the harness cover 16 and the shoulder harness 30, the door portion 52 of the harness cover 16 is initially opened so as to expose the opening 50 and the paired insertion holes 48. Subsequently, the restraint portion 30B of the shoulder harness 30 is drawn out from between the paired guide claws 84, so as to uncouple the shoulder pad 18 from the shoulder harness 30. Then, while the shoulder pad 18 is being slightly bent, the shoulder pad 18 is taken out from the opening 50 to outside of the harness cover 16.

In the meantime, in order, to attach the shoulder pad 18 into the harness cover 16 in the cover attachment state, the shoulder pad 18 is inserted into the harness cover 16 via the opening 50 while the shoulder pad 18 is being slightly bent. Then, the restraint portion 30B of the shoulder harness 30 is inserted into between the paired guide claws 84, so as to hook, on the paired guide claws 84, both end portions of the restraint portion 30B in its width direction. Subsequently, the door portion 52 of the harness cover 16 is folded toward the body portion 42, and is latched to the body portion 42 by means of the paired snap buttons 54.

(Interactions and Effects)

The following describes interactions and effects of the present embodiment.

In the present embodiment, the shoulder pad 18 is placed between the shoulder S of the occupant P sitting on the seat main body 12 and the shoulder harness 30 of the seat belt 14. The shoulder pad 18 includes the elongated hold member 64 along the longitudinal direction of the shoulder harness 30, and the plurality of inserts 68 provided side by side at intervals therebetween in a longitudinal direction of the hold member 64. The plurality of inserts 68 is attached to a shoulder-harness-30-side surface of the hold member 64. The hold member 64 is placed between the plurality of inserts 68 and the shoulder S of the occupant P. This makes it possible to inhibit the occupant P from feeling uncomfortable due to rough texture of the plurality of inserts 68.

Besides, the hold member 64 is formed of a material having a flexibility. This allows those parts of the hold member 64 which are placed between the plurality of inserts 68 to function as hinges. This accordingly allows the hold member 64 to fit the shoulder S of the occupant P successfully. As a result, it is possible to ensure comfortability to the occupant P.

Further, at the time of a vehicle crash, it is possible to support a load from the shoulder S of the occupant P successfully by the plurality of inserts 68 placed between the shoulder harness 30 and the hold member 64, and it is possible to ensure a pressure receiving area with respect to the shoulder S of the occupant P due to the hold member 64. This makes it possible to achieve a successful occupant restraint performance.

Further, the plurality of inserts 68 attached to the shoulder-harness-30-side surface of the hold member 64 makes contact with the shoulder harness 30. This makes it possible to reduce a sliding resistance (frictional resistance) caused when the shoulder pad 18 slides over the shoulder harness 30. Besides, by modifying the material and the shape of the plurality of inserts 68 appropriately, it is possible to easily set and change an energy absorption property.

Further, in the present embodiment, the hold member 64 of the shoulder pad 18 is formed of rubber. Accordingly, it is possible to achieve a successful fitting property to the shoulder S of the occupant P, while ensuring durability of the hold member 64. Further, the plurality of inserts 68 of the shoulder pad 18 is formed of resin. This makes it possible to ensure successful rigidity with respect to a load from the shoulder S of the occupant P.

Further, in the present embodiment, on a surface of the tabular portion 70 provided in the hold member 64 of the shoulder pad 18 which surface faces the shoulder harness 30, the plurality of hold portions 72 is provided side by side at intervals therebetween in the longitudinal direction of the tabular portion 70. Each of the hold portions 72 includes paired projecting portions 74 projecting from respective end portions of the tabular portion 70 in its width direction toward the shoulder harness 30. The paired projecting portions 74 are opened toward an inner side of the tabular portion 70 in the width direction. Respective end portions of the insert 68 in its longitudinal direction are fitted to respective inner sides of the projecting portions 74. This allows the insert 68 to be successfully held by the hold member 64. Further, when the insert 68 is attached to the hold member 64, the respective end portions of the insert 68 in the longitudinal direction are fitted to the respective inner sides of the paired projecting portions 74. Thus, an attachment operation is performed easily. Further, a center of the insert 68 in the longitudinal direction makes contact with the shoulder harness 30 between the paired projecting portions 74. This makes it possible to successfully ensure slidability with respect to the shoulder harness 30.

Further, in the present embodiment, among the plurality of inserts 68 provided side by side in the longitudinal direction of the hold member 64 of the shoulder pad 18, the paired connection inserts 68A attached to respective end portions of the shoulder pad 18 in the longitudinal direction are each provided with a connection portion (the inner guide portion 80 and the paired guide claws 84) to which the shoulder harness 30 is connected slidably. This makes it possible to inhibit the shoulder pad 18 from being displaced carelessly with respect to the shoulder harness 30 in its width direction.

Further, in the present embodiment, among the plurality of inserts 68, the plurality of non-connection inserts 68B placed between the paired connection inserts 68A is each provided with the rib portion 92 that makes contact with the shoulder harness 30. This makes it possible to reduce a contact area of the non-connection insert 68B with respect to the shoulder harness 30. Further, it is possible to reduce a frictional resistance to the shoulder harness 30. As a result, it is possible to achieve successful slidability of the shoulder pad 18 with respect to the shoulder harness 30.

Further, in the present embodiment, the shoulder pad 18 is covered with the harness cover 16 slidably attached to the shoulder harness 30. Since the harness cover 16 makes contact with the shoulder S of the occupant P, it is possible to further improve comfortability to the occupant P.

(Supplementary Description of Embodiment)

In the above embodiment, the shoulder pad 18 is configured to be covered with the harness cover 16. The invention is not limited to this, and may be configured such that the harness cover is omitted.

Further, in the above embodiment, the non-connection insert 68B (non-connection hard member) is configured to include the rib portion 92 that makes contact with the shoulder harness 30. The invention is not limited to this, and may be configured such that the non-connection hard member does not include the rib portion.

Further, in the above embodiment, the paired connection inserts 68A attached to respective end portions of the hold member 64 in the longitudinal direction are each configured to be provided with the connection portion (the inner guide portion 80 and the paired guide claws 84), and the shoulder pad 18 is configured to be connected to the shoulder harness 30 at the connection portion. The invention is not limited to this, a connecting structure of the shoulder pad to the shoulder harness is modifiable appropriately.

Further, in the above embodiment, respective end portions of the insert 68 (the hard member) in the longitudinal direction is configured to be fitted to respective inner sides of the paired projecting portions 74 provided in the hold portion 72 of the hold member 64, so that the insert 68 is attached to the hold member 64. The invention is not limited to this, and how to attach the hard member to the hold member is modifiable appropriately.

Further, in the above embodiment, the hold member 64 is configured to be formed of rubber, and the insert 68 (the hard member) is configured to be formed of resin. The invention is not limited to this. Any hold member is usable provided that the hold member is formed of a material having a flexibility, and any insert is usable provided that the insert is formed of a material that is harder than the hold member.

In addition, the invention can be performed with various modifications without departing from a gist of the invention. Further, it is needless to say that a scope of the invention is not limited to the above embodiment.

What is claimed is:

1. A vehicle child safety seat comprising:
    a seat main body on which an occupant sits;
    a seat belt for restraining the occupant to the seat main body, the seat belt including a shoulder harness having a long belt shape and facing a shoulder of the occupant; and
    a shoulder pad including a hold member formed of a material having a flexibility into an elongated shape and placed between the shoulder of the occupant and the shoulder harness along a longitudinal direction of the shoulder harness, attached to the shoulder harness slidably in the longitudinal direction, and including a plurality of hard members formed of a material harder than the hold member and provided side by side at intervals therebetween in a longitudinal direction of the hold member, the plurality of hard members being attached to a shoulder-harness-side surface of the hold member, wherein
    the hold member includes a tabular portion formed in an elongated plate shape where the longitudinal direction of the shoulder harness is taken as a longer side, and a plurality of hold portions provided on a shoulder-harness-side surface of the tabular portion and placed side by side at intervals therebetween in the longitudinal direction of the tabular portion;

each of the plurality of hold portions including paired projecting portions projecting from respective end portions of the tabular portion in its width direction toward the shoulder harness and opened toward an inner side of the tabular portion in the width direction; and each of the hard members is formed in an elongated shape where the width direction of the tabular portion is taken as a longer side, and is configured such that respective end portions thereof in its longitudinal direction are fitted to respective inner sides of the paired projecting portions.

2. The vehicle child safety seat according to claim 1, wherein:
the hold member is formed of rubber, and
the hard members are formed of resin.

3. The vehicle child safety seat according to claim 1, wherein
each of those paired hard members among the plurality of hard members which are attached to respective end portions of the hold member in the longitudinal direction is provided with a connection portion to which the shoulder harness is connected slidably.

4. The vehicle child safety seat according to claim 3, wherein
each of those hard members among the plurality of hard members which are placed between the paired hard members is provided with a rib portion that makes contact with the shoulder harness.

5. The vehicle child safety seat according to claim 1, further comprising:
a harness cover having paired insertion holes through which the shoulder harness is passed so that the harness cover is slidably attached to the shoulder harness, the harness cover covering the shoulder pad.

6. The vehicle child safety seat according to claim 1, wherein
each of the plurality of hold portions includes paired displacement inhibition portions for connecting the paired projecting, portions to each other in the width direction of the tabular portion, and
each of the hard members is fitted to between the paired displacement inhibition portions.

7. The vehicle child safety seat according to claim 1, wherein
the tabular portion has through holes formed in parts opposed to the projecting portions.

8. A shoulder pad comprising:
a hold member formed of a material having a flexibility, and including a tabular portion formed in an elongated plate shape and a plurality of hold portions provided on one surface of the tabular portion so as to be placed side by side at intervals therebetween in a longitudinal direction of the tabular portion; and
a plurality of hard members including paired connection hard members held by hold portions placed at respective end portions of the hold member in its longitudinal direction, and one or more non-connection hard members held by the hold portions between the paired connection hard members, the paired connection hard members and the one or more non-connection hard members being formed of a material that is harder than the hold member, wherein each of the paired connection hard members is provided with a connection portion for slidably connecting thereto a shoulder harness provided in a seat belt of a vehicle child safety seat, wherein
the tabular portion is formed in the elongated plate shape where the longitudinal direction of the shoulder harness is taken as a longer side, and the plurality of hold portions is provided on a shoulder-harness-side surface of the tabular portion and placed side by side at intervals therebetween in the longitudinal direction of the tabular portion;
each of the plurality of hold portions including paired projecting portions projecting from respective end portions of the tabular portion in its width direction toward the shoulder harness and opened toward an inner side of the tabular portion in the width direction; and
each of the hard members is formed in an elongated shape where the width direction of the tabular portion is taken as a longer side, and is configured such that respective end portions thereof in its longitudinal direction are fitted to respective inner sides of the paired-projecting portions.

9. The shoulder pad according to claim 8, wherein
each of the plurality of hold portions includes paired displacement inhibition portions for connecting the paired projecting portions to each other in the width direction of the tabular portion; and
each of the hard members is fitted to between the paired displacement inhibition portions.

10. The shoulder pad according to claim 8, wherein
the tabular portion has through holes formed in parts opposed to the projecting portions.

* * * * *